Nov. 29, 1960 — A. THOMAS — 2,962,593
PROPORTIONAL VALVE
Filed Nov. 4, 1957

INVENTOR.
ALEXANDER THOMAS
BY
Joseph Weingarten
ATTORNEY

United States Patent Office 2,962,593
Patented Nov. 29, 1960

2,962,593

PROPORTIONAL VALVE

Alexander Thomas, Weston, Mass., assignor to Tracerlab, Inc., Waltham, Mass., a corporation of Massachusetts Filed Nov. 4, 1957, Ser. No. 694,421

20 Claims. (Cl. 250—84.5)

The present invention relates in general to fluid flow control apparatus, and more particularly to a proportional valve for maintaining predetermined stable low pressures in gas flow systems.

Although the proportional valve of the present invention has broad general application in the field of pressure control, it will be convenient to discuss its advantages with reference to a specific problem, namely, that of maintaining a stable low gas pressure in a discharge tube such as a neutron generator. In the operation of a neutron generator or similar gas discharge device, it is necessary to maintain a constant low gas pressure in the enclosed system despite the fact that gas is being introduced to the system at a non-constant rate. To achieve this result, an exhaust pump is coupled into the gas system through a valve which is adjusted in accordance with pressure variations in the discharge tube. The critical element in such a system is the valve, which typically in the past consisted of a plug of high magnetic permeability which gravitationally closed off the passage to the pump unless lifted by the action of a concentric solenoid which surrounded the valve structure. This solenoid was placed slightly above the center of the plug, hence, when actuated by an A.-C. or D.-C. current, a force was developed which tended to draw the plug to the center of the solenoid to open the valve. A limitation of this type of valve structure, inherent from solenoid operation, is that the magnetic field at the center of the solenoid is greater than elsewhere, hence once open, the plug would tend to remain in that condition despite a decrease in current. Evidently, then, a system so constructed lacked the desired proportionality and speed of response, and further was wholly insensitive to small changes in pressure in either direction.

The present invention has as a primary object the provision of exceedingly sensitive fluid flow control apparatus capable of responding rapidly and proportionally to changes in pressure.

Another object of this invention is to provide apparatus for electrically controlling a gas pumping rate wherein the pumping rate is automatically varied in direct proportion to the pressure within the volume being pumped.

Another object of this invention is to provide a multiplicity of magnetic elements for adjusting the opening of a gas flow control valve.

A further object of this invention is to provide a valve for controlling a gas pumping rate for maintaining stable low pressures within gas discharge tubes such as neutron generators.

Broadly speaking, the proportional valve of this invention includes a valve seat and a coacting valve seal. The latter element is secured to a pivotally mounted bar magnet whose position is controlled by a pair of magnetic field sources, one a solenoid which encompasses the valve structure, the other a magnet which limits the excursion of the bar magnet under the influence of the solenoid field. By oppositely controlling the magnet and solenoid fields from suitable pressure responsive devices, the combined system provides a control whereby wide pressure deviations are rapidly corrected at a rate in proportion to their magnitude without overshoot or valve chatter.

Other features, objects and advantages of the present invention will now become apparent from the following detailed description when taken in connection with the accompanying drawing wherein.

Figure 1:
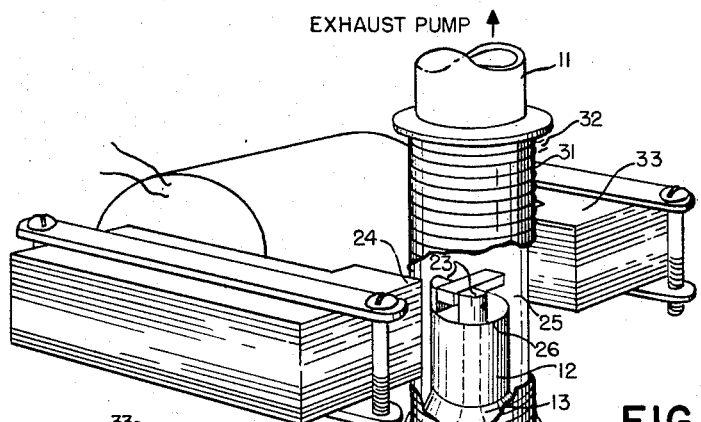
Fig. 1 is a partly broken, general perspective view illustrating the valve structure of this invention.
Figure 2:
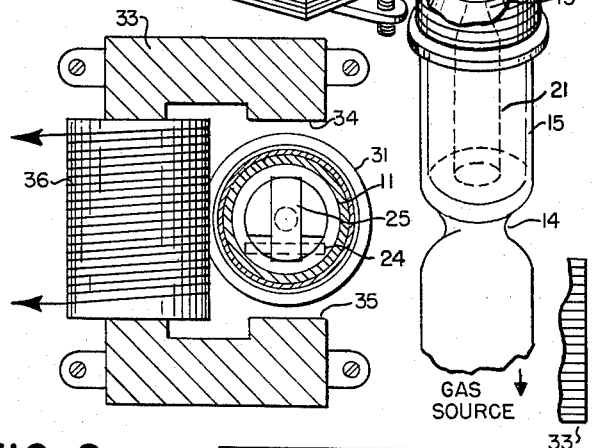
Fig. 2 is a plan view partly in section illustrating certain details of the valve elements illustrated in Fig. 1.
Figure 3:
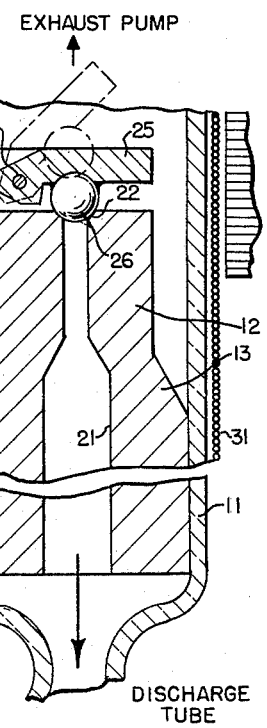
Fig. 3 is a fragmentary, enlarged cross-sectional view taken along the line 3—3 of Fig. 1.

With reference now to the drawing, and more particularly to Figs. 1, 2 and 3, a preferred embodiment of the novel valve structure of this invention is disclosed. The operating components of this valve are housed within a generally cylindrical tube 11 which may be of glass or the like as required by the particular pumping system. The base of the valve element is formed of a cylindrical metallic block 12 which is flared outwardly at 13 so that the base thereof fits snugly within the glass tube 11. To prevent the block 12 from slipping down the tube below a predetermined point, the glass tube 11 may be constricted as at 14. As illustrated diagrammatically, the upper end of glass tube 11 may be connected to a suitable vacuum pump, while the lower end is coupled to the source of gas being pumped in the system.

It will become apparent that it would be undesirable to permit the gas within the system to leak through in the region between the valve base 12 and the glass tube 11. Thus, it may be desirable to hermetically seal a ring of suitable metal such as Kovar into the glass tube at 15 which ring is then soldered along its entire periphery to the lower portion of the valve base 12.

As is most clearly illustrated in Figs. 1 and 3, the base member 12 is formed with an axial bore 21 which terminates at its upper end in a smoothly tapered circular valve seat 22. A pair of supporting lugs 23—23 extend beyond the upper surface of valve base 12 and by means of pin 24 pivotally support a small bar magnet 25. A small ball 26 is soldered or otherwise conveniently attached to the underside of bar magnet 25, the ball being arranged as illustrated in Fig. 3 to form a valve seal which closely engages the tapered valve seat 22 in the position normally assumed under the influence of gravitational forces alone. As shown in Fig. 3, when the bar magnet 25 is pivoted upward, ball 26 is disengaged from seat 22 to allow the free flow of gas through the axial passage 21 and into the region of tube 11 connected to the exhaust pump.

As most clearly illustrated in Figs. 1, 2 and 3, two external magnetic field sources are associated with the valve structure in the region of bar magnet 25. The first of these is a solenoid 31 which concentrically encompasses tube 11 from a point well below to a point well above bar magnet 25. Solenoid 31 is actuated by applying a suitable current thereto at input leads 32.

The second of these external magnetic field sources is a magnet, which as shown in Figs. 1, 2 and 3, comprises a laminated core electromagnet 33, the pole faces of which are aligned with the bar magnet axis when in the closed position shown in Figs. 1 and 3. Electromagnet 33 is energized by passing current through magnet coil 36.

With the foregoing discussion of the stuctural interrelationship of the components of this valve structure in view, the nature of its operation will now be discussed. As noted earlier, gravity alone ordinarily will cause the ball seal 26 to firmly engage valve seat 22. The weight of bar magnet 25 is sufficient to retain this secure seal despite considerable pressure differential between the exhaust pump side and the gas source side of the system.

When current is passed through solenoid 31 in the appropriate direction, a solenoidal field parallel to the axis of tube 11 is created. This field imposes a torque on magnet 25 which tends to lift it from the associated valve seat 22. Analysis shows that the equation governing the physical position of bar magnet 25 may be expressed as follows:

$$MH \cos \theta = ml \cos \theta$$

where $M$ = magnetic moment of bar magnet 25
$H$ = magnetic field due to coil 31
$\theta$ = angle between bar magnet 25 and the horizontal
$m$ = mass of bar magnet 25
$l$ = distance from pivot to the center of gravity of the bar magnet Evidently, then, both the torque due to gravity and the torque due to the solenoidal field created by current through coil 31 are proportional to the cosine of the angle that the bar magnet makes with the horizontal. It follows, therefore, that the bar magnet when under the influence of the solenoid field alone has only two static positions, wholly open, or wholly closed. Expressed otherwise, as the solenoid field is increased, the valve will remain shut until a particular value of current is reached at which point the valve will open fully.

Fine control of the valve position is achieved by introducing the field of magnet 33 which effectively permits static equilibrium at all intermediate positions between wholly opened and wholly closed. Thus, when the solenoid magnetic field is of sufficient strength to raise bar magnet 25 about its pivot, the equilibrium position will be determined by the strength of the field of magnet 33.

Certain features and advantages which may be achieved in the operation of the valve structure shown in Figs. 1, 2 and 3 may now be discussed. For example, it is clear that for a fixed transverse field generated by magnet 33, a degree of control may be obtained simply by varying the current in solenoid 31; thus, increasing currents will further open the valve while decreasing currents will tend to close the valve. From this it may be seen that magnet 33 may be replaced by a permanent magnet having the same general pole face structure and that valve control is available simply by varying current in solenoid 31. However, a much finer degree of pressure control and sensitivity is available through the use of the magnet configuration shown in the drawing by first applying fixed static currents to solenoid 31 and coil 36, and then attaining the valve position adjustment by oppositely varying the two currents. The effect of such control is to prevent backlash and overshoot in the pumping control, hence, a more stable pressure in the controlled region.

Figure 4:
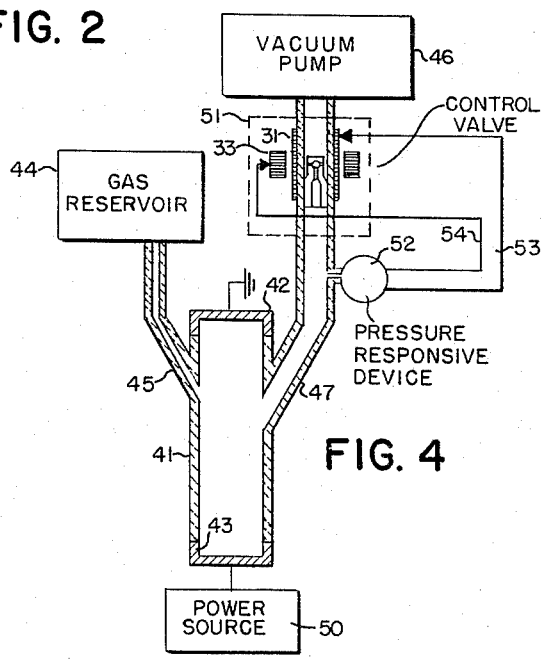
Fig. 4 illustrates a typical gas discharge device which utilizes the apparatus disclosed in Figs. 1, 2 and 3 for gas pressure control.

Fig. 4 illustrates the valve structure of Figs. 1, 2 and 3 in use in a typical gas discharge device such as a neutron generator. Thus, the neutron generator generally consists of a cylindrical glass envelope 41 capped at opposite ends thereof by the cup-shaped metallic electrodes 42 and 43 and energized from a suitable power source 50. A gas reservoir 44 furnishes the discharge atmosphere to the tube through an inlet tube 45 and gas flow is maintained by a vacuum pump 46 which exhausts the envelope 41 through a tube 47 that includes the valve structure diagrammatically illustrated within the broken lines 51. A pressure responsive device 52 which may be of conventional design such as a Pirani gauge, is shown communicating with the interior of tube 47.

By means which will be discussed below, pressure responsive device 52 furnishes two currents on leads 53 and 54 to solenoid coil 31 and to electromagnet 33, respectively. For operation in the preferred manner, the current in line 53 increases as the gas pressure within envelope 41 increases while the current in line 44 decreases under the same conditions. Consequently, as the pressure in the discharge region between electrodes 42 and 43 increases above the predetermined desired value, the current in solenoid 31 increases while the current in the electromagnet 33 decreases, the result being that the valve tends to open further. Conversely, as the pressure within envelope 41 drops, for any reason whatsoever, the current in line 53 will decrease while that in line 54 will increase. This will tend to close the valve to permit the pressure within tube 41 to increase to the desired value.

Various techniques, which do not constitute a part of the present invention, may be used to obtain the oppositely varying currents on lines 53 and 54. For example, if a Pirani gauge is used, a current is obtained which increases for a change of pressure in one direction. An opposite current may be obtained simply by using a conventional electronic polarity inverter. More specifically, in neutron generator applications, the pressure within the discharge envelope may be sensed by sampling the discharge current itself. Thus, it is well known that as the pressure within the discharge tube increases, the discharge current itself will increase. By incorporating a small resistor in the discharge current circuit, a voltage may be derived which increases with increasing envelope pressures. As earlier mentioned, conventional electronic circuit means may be used to obtain an oppositely varying current so that both external magnetic circuits shown in Figs. 1, 2 and 3 may be oppositely controlled. Through the use of such an arrangement in association with a neutron generator discharge tube, the pumping rate may be adjusted so that potentially wide excursions from the desired pressure within the discharge tube are corrected by correspondingly rapid changes in valve position.

Numerous alternative modes of operation are feasible with the valve disclosed herein. For example, it is possible to achieve effective pressure control simply by passing a pulsed direct current through solenoid 31, which results in constant vibration of bar magnet 25 about some mean position. If the frequency of this vibration is high and the rotational displacement is small, the pressure variation due to vibration alone will be negligible, and the means position of the magnet will be a function of the magnitude of the pulse current. If this current is controlled by a pressure responsive device, then the mean position will be a function of the pressure within the system. This mode of operation provides very rapid response since the frequency of vibration is relatively high and the amplitude of the vibration is relatively small so that the time required to change from one mean position to another and the difference in pumping rate within each cycle are negligible.

In view of the fact that numerous modifications and departures may now become apparent to those skilled in the art, the invention herein is to be construed as limited only by the spirit and scope of the appended claims.

What is claimed is:

1. Fluid flow control apparatus comprising, a magnetic valve element, means for applying a magnetic field in one direction for actuating said valve element, and independent magnetic means providing a field in another non-parallel direction for opposing the effect of said magnetic field on said valve element.

2. Fluid flow control apparatus comprising, a magnetically operable valve element, means for applying a magnetic field in one direction for actuating said valve element, and independent magnetic means providing a field in another non-parallel direction for limiting the effect of said magnetic field on said valve element.

3. Fluid flow control apparatus comprising, a magnetically operable valve element, means for applying a magnetic field in one direction arranged to initiate a stable open state for said valve element, and independent magnetic means providing a field in another non-parallel direction for opposing the effect of said magnetic field to limit motion of said valve element.

4. Fluid flow control apparatus comprising, a valve structure including a pivotally supported bar magnet, means for establishing a first magnetic field for imparting a torque to said bar magnet tending to open said valve structure, and means for establishing a second magnetic field angularly intersecting said first magnetic field for opposing motion of said bar magnet in response to said torque.

5. Fluid flow control apparatus comprising, a valve structure including a pivotally supported bar magnet, means for establishing a first magnetic field substantially perpendicular to said bar magnet and parallel to the plane defined by pivotal motion thereof for imparting a rotational torque thereto, and means for establishing a second magnetic field substantially parallel to said bar magnet for controlling the effect of said first magnetic field.

6. Fluid flow control apparatus comprising, a valve structure including a pivotally supported bar magnet, means for establishing a solenoidal magnetic field substantially perpendicular to said bar magnet and parallel to the plane defined by pivotal motion thereof for imparting a rotational torque thereto, and means for establishing a second magnetic field substantially parallel to said bar magnet and transverse of said solenoidal field for controlling the extent of motion of said bar magnet.

7. Gas flow control apparatus comprising, a valve structure including a valve seat and a cooperating valve seal, a pivotally supported bar magnet for actuating said valve seal, a solenoid surrounding said valve structure and arranged to provide when energized a first magnetic field substantially perpendicular to said bar magnet and parallel to the plane defined by pivotal motion thereof, and electromagnetic means for providing a second magnetic field parallel to said bar magnet taken when said valve seal is in engagement with said valve seat.

8. Gas flow control apparatus comprising, a generally cylindrical tube having a valve seat, a cooperating valve seal providing when engaged against said seat a gas tight closure in said tube, a pivotally supported bar magnet for actuating said seal, said bar magnet being disposed transversely of said tube when in said engaged condition, a solenoid coil concentric with and encompassing said tube in the region of said valve seat and bar magnet, and a second magnet for providing a field transverse to said tube and parallel to said bar magnet.

9. Gas flow control apparatus in accordance with claim 8 and including pressure responsive means for energizing said solenoid coil.

10. Gas flow control apparatus in accordance with claim 8 and including pressure responsive means for simultaneously energizing said solenoid and activating said second magnet.

11. Gas flow control apparatus comprising, a generally cylindrical tube having a valve seat, a cooperating valve seal providing when engaged against said seat a gas tight closure in said tube, a pivotally supported bar magnet for actuating said seal, said bar magnet being disposed transversely of said tube when in said engaged condition, a solenoid coil concentric with and encompassing said tube in the region of said valve seat and bar magnet, and an electromagnet having a pair of opposed poles substantially aligned with the poles of said bar magnet with the latter disposed for closure of said seal against said seat for providing a field transverse to said tube and parallel to said bar magnet.

12. Gas flow control apparatus in accordance with claim 11 and including means responsive to pressure in a portion of said tube for simultaneously energizing said solenoid and said electromagnet.

13. Gas flow control apparatus in accordance with claim 11 including means for applying currents to said solenoid and said electromagnet, and means responsive to pressure in a portion of said tube for oppositely affecting said solenoid and electromagnet currents.

14. Gas flow apparatus in accordance with claim 11 wherein said valve seal comprises a ball secured to said pivotally supported bar magnet adapted to fit within said valve seat.

15. Gas flow apparatus in accordance with claim 11 and including means for applying a first current to said solenoid adapted to establish a first magnetic field tending to lift said seal from said seat, and means for applying a second current to said electromagnet to establish a second magnetic field tending to restrain said lifting action of said first magnetic field.

16. Gas flow control apparatus in accordance with claim 15 and including means responsive to pressure in a portion of said tube to oppositely affect said first and second currents.

17. Gas flow apparatus in accordance with claim 16 and including a pump and a gas source joined to opposite ends of said tube, said pressure responsive means being thereby adapted to proportionally vary the gas flow through said valve seat from said source to said pump.

18. Apparatus for generating neutrons comprising, a gaseous discharge tube, means for applying power to said tube, a source of discharge gas communicating with the interior of said tube, a vacuum pump coupled to the interior of said tube for exhausting gas therefrom, gas flow control means between said tube and said vacuum pump including a valve seat, a cooperating valve seal providing when engaged against said seat a gas tight closure between said tube and said vacuum pump, a pivotally supported bar magnet for actuating said seal, a solenoid coil encompassing said bar magnet, the axes of said solenoid and bar magnet being substantially perpendicular and an electromagnet having a pair of opposed poles substantially aligned with the poles of said bar magnet with the latter disposed for engagement of said seal with said seat for providing a field parallel to said bar magnet, and means for sensing the pressure within said discharge tube for energizing said solenoid coil and said electromagnet.

19. Apparatus for generating neutrons in accordance with claim 18 wherein said pressure sensing means provides oppositely varying currents to said solenoid coil and said electromagnet.

20. Apparatus for generating neutrons in accordance with claim 18 wherein said pressure sensing means simultaneously provides an increasing current to said solenoid coil and a decreasing current to said electromagnet for increasing pressures within said tube and vice versa for decreasing pressures within said tube.

References Cited in the file of this patent

UNITED STATES PATENTS

| | | |
|---|---|---|
| 854,300 | Moore | May 21, 1907 |
| 2,240,914 | Schutze | May 6, 1941 |
| 2,310,562 | Whittington | Feb. 9, 1943 |
| 2,640,496 | Sheppard | June 2, 1953 |